Figure 1:
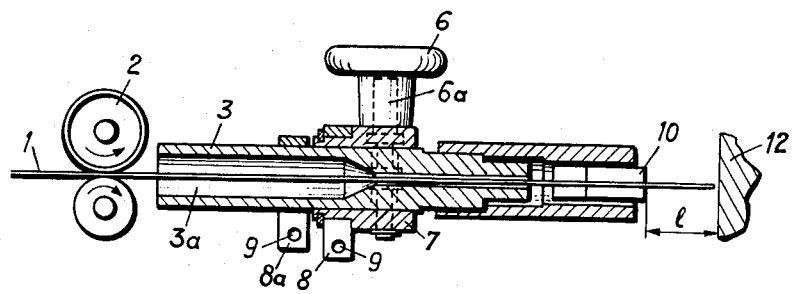

Sept. 21, 1965 R. RIEGER 3,207,885
NOZZLE ADJUSTMENT DEVICE FOR SUBMERGED-ARC
AUTOMATIC WELDING MACHINES
Filed Aug. 22, 1962

INVENTOR.
Rainer Rieger
BY Werner W. Kleeman
ATTORNEY

United States Patent Office 3,207,885
Patented Sept. 21, 1965

3,207,885
NOZZLE ADJUSTMENT DEVICE FOR SUB-
MERGED-ARC AUTOMATIC WELDING
MACHINES
Rainer Rieger, Eisenberg, Pfalz, Germany, assignor to
Holding Intercito S.A., Zurich, Switzerland
Filed Aug. 22, 1962, Ser. No. 218,679
Claims priority, application Switzerland, Aug. 30, 1961,
10,072/61
3 Claims. (Cl. 219—130)

The present invention broadly relates to improved electrode holder and adjustment means for adjusting the position of the holder relative to a workpiece. More specifically, the present invention has reference to improved apparatus for submerged-arc (beneath powder) automatic welding equipment which allows for independently adjusting the position of the current nozzle or holder for transmitting the welding current to the welding wire in the direction of said welding wire in accordance with the selected welding data, such as current intensity, voltage, welding speed and the properties of the powder material, and at the same time for the purpose of multiple-electrode welding permits the welding current nozzle to be rotated about the axis of said nozzle transverse to the direction of the welding wire.

It is known that in order to achieve perfect or satisfactory submerged-arc (beneath powder or powder shielded) weld seams, the free end of the welding wire between the welding current nozzle or electrode holder and workpiece must be as short as possible, so that the welding wire does not unpermissively heat in consequence of its electric resistance. On the other hand, the free end of the welding wire must nonetheless be long enough that a sufficiently high powder layer or embankment results which prevents a striking out of the arc. Thus, for this purpose the current nozzle must be adjustable in the direction of the welding wire. In previous prior art constructions such was accomplished by either displacing the entire upper portion of the automatic welding machine, the carrying arm including the welding head and wire payoff reel, or by at least displacing the welding head for itself. A rotation of the current nozzle or electrode holder about its axis had to be separately undertaken.

Accordingly, a primary object of the present invention is to provide an improved apparatus which permits for an independent adjustment of the position of the current nozzle in the direction of the welding wire without necessitating movement of the large mass of the welding head or even the entire upper portion of the automatic welding machine, and that simultaneously with this adjustment there is combined a rotation of the current nozzle about its longitudinal axis.

Another important object of the present invention is the provision of improved means for adjustably supporting an electrode holder or current nozzle for welding wire or wires, which permits displacement of said electrode holder in the direction of its longitudinal axis for selectively positioning the free end of the welding wire from a workpiece, as well as permitting for rotation of said electrode holder about its longitudinal axis.

A further important object of the present invention is to provide an improved electrode holder arrangement for welding wire which permits adjustment of the position of the electrode holder lengthwise of its axis as well as for rotation about said axis.

Yet a further important object of the present invention is to provide an improved electrode holder permitting for adjustment of said electrode holder and its supported welding rod relative to the workpiece in longitudinal direction as well as providing for rotational movement of the electrode holder about its axis, and particularly adapted for multiple-electrode welding.

Still a further important object of the present invention is to provide an improved construction of electrode holder for one or more welding electrodes, which is provided with improved means permitting lengthwise positioning of said electrode holder with respect to its longitudinal axis as well as rotational movement about said longitudinal axis, so that the position of the free end of the electrode with respect to the workpiece can be easily and simply set.

In accordance with a preferred manifestation of the present invention there is provided an improved nozzle arrangement for submerged-arc automatic welding equipment which is capable of adjusting the free length of the welding wire extending beyond the current contact jaws with respect to a workpiece. To this end, there is provided a preferably circular tube member having a hollow axial passageway or bore through which extends a welding wire or rod. The tube member is further provided with a longitudinal extending tooth construction which cooperates with a pinion adapted to be operated by a hand-wheel. The tube member is guided in a suitable support 8 for movement in longitudinal direction. The shaft for the pinion is mounted in a bushing or the like which is rotatably guided by the support member. By virtue of such arrangement there is provided means for adjusting the axial position of the electrode holder and electrode rod relative to a workpiece.

The bushing is arranged in such a manner that the tube member together with the pinion and hand-wheel are mounted for rotation about the longitudinal axis of the tube member. In this manner the electrode holder can be rotated about its longitudinal axis and is particularly suitable for multiple-electrode welding operations. In addition to the foregoing, means are provided for setting the adjusted position of the tube member once it has been determined which position is desired.

Still further objects and the entire scope of applicability of the present invention will become apparent from the detailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

Figure 2:
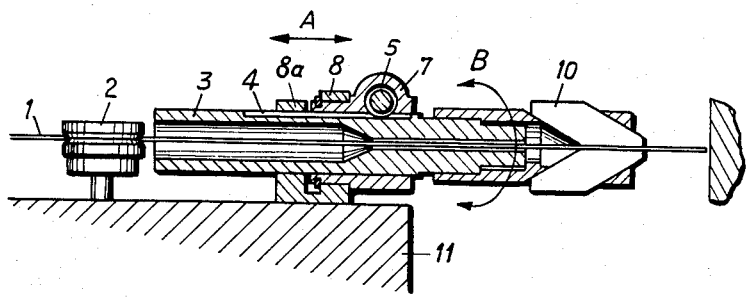

In the drawings:

FIGURE 1 is a longitudinal cross-sectional view taken through the apparatus of the present invention; and FIGURE 2 is also a longitudinal cross-sectional view of the apparatus depicted in FIGURE 1, although viewed in a plane which is displaced 90° from the plane of FIGURE 1.

Referring now to the drawing, it will be recognized that the welding wire or electrode 1 is fed through the agency of a suitable wire feed mechanism 2, which in the desired form shown embodies grooved pulleys or sheaves, into the adjustment apparatus designed according to the present invention. This adjustment device comprises a hollow circular holder or tube member 3 for conducting the welding current. The tube member 3 is provided with an axially extending bore 3a through which passes the electrode or welding wire 1 in the direction of the forwardly arranged current contact jaws 10. In the body or tube member 3 there is cut or milled a longitudinally extending tooth construction or rack 4. A pinion 5 engages the tooth construction 4 which can be easily turned through the intermediary of a hand-wheel 6 operatively connected to said pinion via its shaft 6a. The pinion 5 is mounted in a bushing 7 which, in turn, is held by a support member 8 connected to a welding head 11. The support member 8 is so constructed that it still separately guides the adjustable tube member 3 in its upper portion 8a. Additionally, the support member 8 is provided with clamping jaws 9.

In order to adjust the position of the free outlet end $l$ of the welding wire 1 between the current contact nozzle or jaws 10 and the work-piece 12 there is accomplished a movement in the direction of the welding wire 1, as represented by the double-headed arrow A. Such is done by turning the hand-wheel 6 and therewith the pinion 5 through the cut-tooth construction 4 of the adjustable tube 3, in order to adjust for the correct free outlet length $l$ of the welding wire 1. In addition thereto, it is possible in every desired position within the range of movement in the direction A, to rotate the bushing 7 in the support member 8 connected to the welding head 11 about the longitudinal axis of the described arrangement in the direction of the double-headed arrow B, so that with a multiple-electrode welding process (two welding wires) both of the welding wires come to rest adjacent or behind one another and can be welded. With the aid of the clamping screws 9 the adjustably positionable tube member 3 can be arrested in each position in the direction of the welding wire (direction A) and in the desired rotational (direction B).

While the present invention has been described with specific reference to submerged arc welding employing powder shielding, it will be recognized that the teachings thereof can be employed whenever it is desired to adjust the position of electrode holder and electrode relative to a workpiece.

Having thus described the present invention what is desired to be secured by United States Letters Patent is:

1. Nozzle arrangement for submerged-arc automatic welding-equipment for adjusting the free length of welding wire extending beyond current contact jaws, comprising a circular tube member, longitudinally extending tooth means provided for said circular tube member, support means for guiding said circular tube member, a pinion engaging said tooth means, a hand-wheel including a rotatable shaft member operatively connected with said pinion for adjusting the position of said circular tube member in the lengthwise direction of said welding wire, a bushing member for rotatably supporting said shaft member, said bushing member being rotatably guided in said support means in such a manner that said circular tube member together with said pinion and said hand-wheel are rotatable about the longitudinal axis of said circular tube member.

2. Nozzle arrangement according to claim 1; wherein clamp means are provided for fixedly retaining said circular tube member in any desired adjusted position.

3. Nozzle arrangement according to claim 2; wherein said support means is constructed as said clamp means.

References Cited by the Examiner

UNITED STATES PATENTS 2,897,341    7/59    MacKusick _____ 219—130

RICHARD M. WOOD, *Primary Examiner.*